United States Patent Office 3,479,071
Patented Nov. 18, 1969

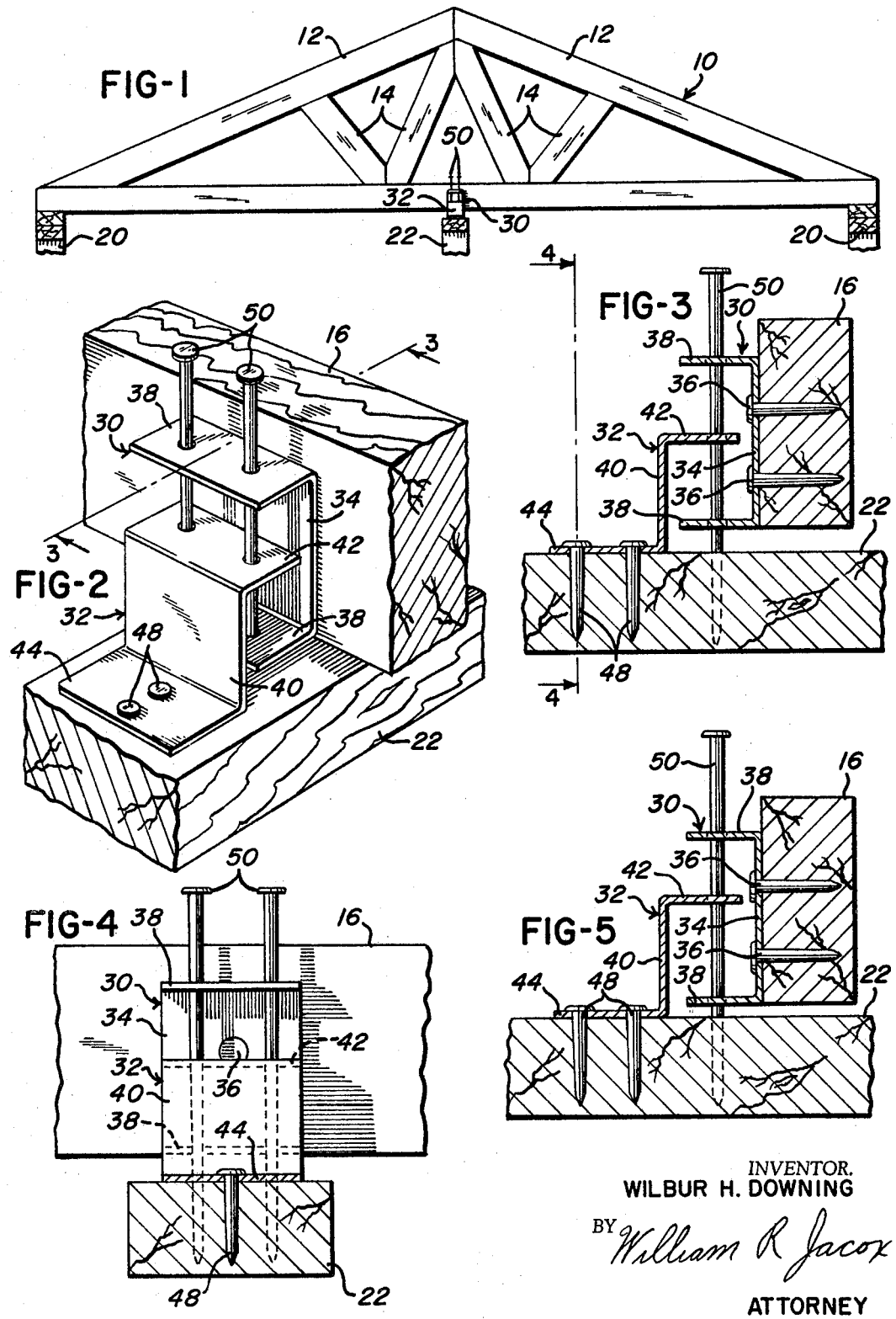

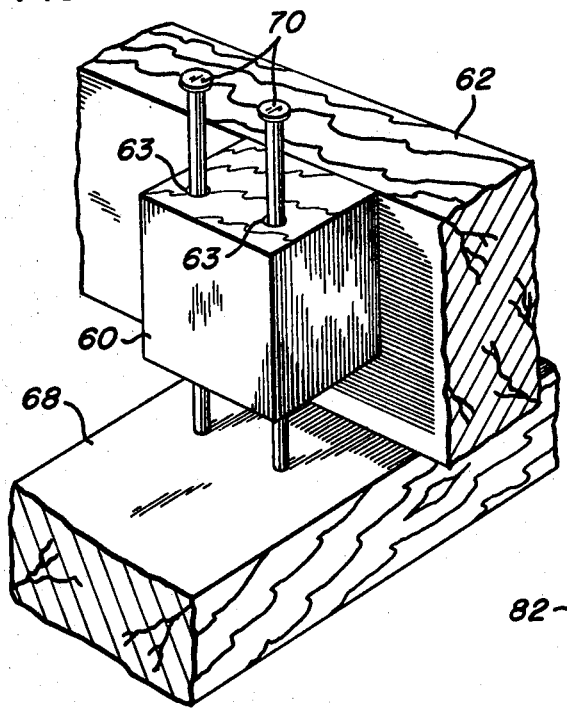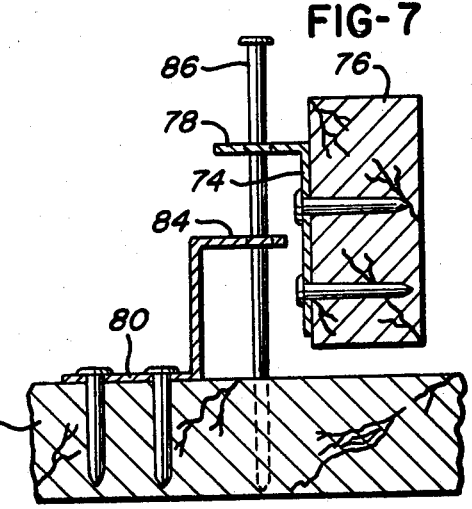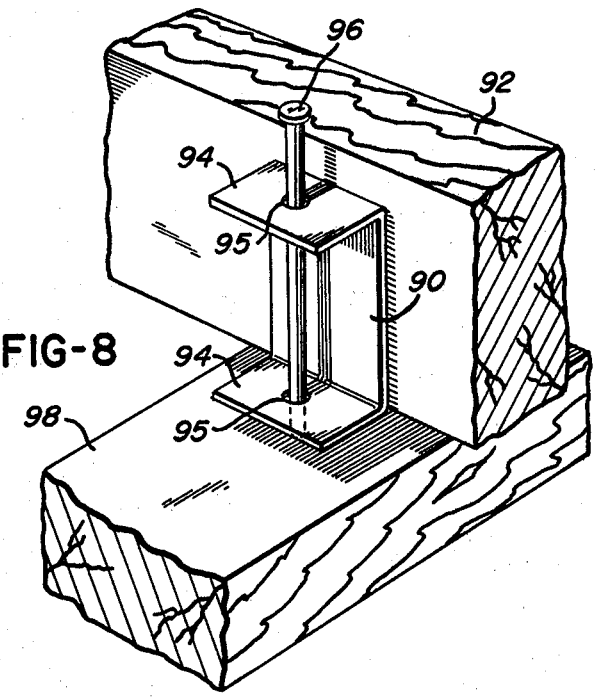

3,479,071
CONNECTOR UNIT
Wilbur H. Downing, 921 Porter Ave.,
Dayton, Ohio 45407
Filed Sept. 23, 1965, Ser. No. 489,634
Int. Cl. F16b 7/00, 5/00, 9/00
U.S. Cl. 287—20.94                     3 Claims

ABSTRACT OF THE DISCLOSURE

Connector device for connecting a pair of adjacent members together so that relative motion therebetween can take place in one direction only in which pin means is fixed to one member and extends therefrom in said one direction while and element reciprocable on the pin means is fixed to the other member in spaced relation to said one member and the pin means has head means thereon spaced from the said element.

---

This invention relates to a connector unit. The invention relates more particularly to a connector unit for use in building construction. However, a connector unit of this invention is also usable in many other types of construction.

A building ordinarily includes a substantially horizontal support member or cross member which is carried by two opposed external walls of the building. One or more internal walls of the building are attached to the cross member.

In the past, problems have occurred with regard to the internal wall and the cross member. Usually, the internal wall of the building has been secured to the cross member by nails or screws or the like. It has been found that expansion and contraction of various members of the building has resulted in relative movement between the internal wall and a cross member to which the wall is attached. Because of the firm attachment of the internal wall to the cross member, strains and forces have been produced between the cross member and an internal wall attached thereto. Such strains and forces have caused cracking and other objectionable conditions in the surface of the internal wall and in other portions of the building.

In the construction of other buildings, in order to avoid forces and strains in the internal wall, the internal wall has not been connected to the cross member. When there is no connection between the internal wall and the cross member, there may be objectionable lateral movement of the upper portion of the internal wall.

It is an object of this invention to provide connection means for attaching two members of a building or the like one to the other so that relative movement between the members produces no strain or forces therebetween.

Another object of this invention is to provide such connection means which prevents lateral movement of an internal wall with respect to a support member or cross member.

Another object of this invention is to provide such means which can be produced at relatively low costs and which is easily installed.

Other objects and advantages reside in the construction of the invention, combinations thereof, the method of manufacture, and the mode of operation, as will become more apparent from the following description.

In the drawings:

FIGURE 1 is an elevational view of a connector unit of this invention attached to members of a building.

FIGURE 2 is a perspective view, drawn on a much larger scale than FIGURE 1, showing the connector unit of FIGURE 1 and the building members attached thereto.

FIGURE 3 is a sectional view taken substantially on line 3—3 of FIGURE 2.

FIGURE 4 is a sectional view taken substantially on line 4—4 of FIGURE 3.

FIGURE 5 is a sectional view similar to FIGURE 3, illustrating the two building members in different relative positions from those shown in FIGURE 3. This view illustrates the operation of the connector unit as such relative movement of the building members occurs.

FIGURE 6 is a perspective view of another connector unit of this invention attached to building members.

FIGURE 7 is a side sectional view of another connector unit of this invention attached to building members.

FIGURE 8 is a perspective view of another connector unit of this invention attached to building members.

Referring to the drawings in detail, FIGURE 1 shows a truss 10 which supports a roof, not shown. The truss 10 comprises rafters 12, struts 14, and a cross member 16. The cross member 16 is supported by two external wall members 20 and extends therebetween.

An internal wall structure or member 22 is disposed intermediate the wall members 20. The internal wall structure or member 22 is spaced slightly from the cross member 16. A connector unit of this invention is employed to attach the cross member 16 to the internal wall structure 22.

The connector unit comprises a connector element or bracket 30, which is in the general form of a letter C, and a connector element or bracket 32 which is shown as being generally in the form of a letter Z. The connector element 30 has a body portion 34 which is attached to the cross member 16 by any suitable means, such as by means of nails 36, or the like. The connector element 30 has a pair of flange portions or leg portions 38 which extend laterally from the body portion 34 at each end thereof.

The connector element 32 has a body portion 40 provided with a flange or leg portion 42 at one end thereof and a flange or leg portion 44 at the other end thereof. The flange 42 and the flange 44 extend from the body portion 40 in opposite directions. The flange 44 is attached to the internal wall 22 by any suitable means, such as by nails 48 or the like.

The flange 42 of the connector element 32 is disposed intermediate the leg portions 38 of the connector element 30.

The flanges 38 and the flange 42 have aligned holes through which nails or spikes, or pins 50 or the like extend.

The nails or spikes or pins 50 are secured within the internal wall structure 22. Thus, the internal wall structure 22 is attached to the cross member 16.

The nails or spikes or pins 50 are slightly smaller than the holes in the flanges 38 of the bracket 30. Thus, the pins 50 are freely axially movable with respect to the flange portions 38 of the connector element 30.

Therefore, the pins or spikes 50 and the connector elements 30 and 32 connect the building members 16 and 22 together and prevent relative lateral movement therebetween but permit the spacing between the members 16 and 22 to change. For example, FIGURE 3 shows a given relative position between the building members 16 and 22. FIGURE 5 shows another relative position between the building members 16 and 22. Such change in spacing between the building members 16 and 22 can readily occur as the connector elements 30 and 32 readily move one with respect to the other, guided by the pins or spikes 50.

Therefore, with expansion and contraction of various members of the building, relative movement between the cross member 16 and the wall member 22 is permitted without causing strains or forces between the wall member 22 and the cross member 16.

FIGURE 6 shows another connector unit of this invention. A block or bracket 60 is attached to a building member 62 by any suitable means and may be integral therewith, if desired. The block 60 has a pair of holes 63 therethrough.

A pair of spikes or pins 70 extend through the holes 63 in the block 60 and are secured to a building member 68, which is spaced slightly from the member 62. The holes 63 in the block 60 are larger in dimension than the pins 70. Thus, the pins 70 and the block 60 are relatively movable. Thus, the members 62 and 68 are relatively movable toward and away from each other while being connected together by a connector unit of this invention.

FIGURE 7 shows another connector unit of this invention which comprises a bracket 74 which is attached to a member 76. The bracket 74 has a flange 78 provided with a hole therethrough.

A bracket 80 is attached to a member 82. The bracket 80 has a flange 84 which is provided with a hole therethrough. A spike or pin 86 extends through the holes in the flanges 78 and 84 and is secured to the member 82. The pin 86 extends freely through the hole in the flange 78 of the bracket 74. Thus, the members 76 and 82 are relatively movable toward and away from each other while being connected together by a connector unit of this invention.

FIGURE 8 shows another connector unit of this invention comprising a bracket 90 which is attached to a member 92. The bracket 90 has one or more flanges 94, each of which has a hole 95 therethrough. A spike or pin 96 freely extends through the hole 95 in each flange 94 and is secured to a member 98. Thus, the members 92 and 98 are relatively movable toward and away from each other while being connected together by a connector unit of this invention.

Thus, a connector unit of this invention connects a plurality of spaced-apart members together and permits change in spacing therebetween while preventing relative lateral movement thereof.

Although the preferred embodiment of the device has been described, it will be understood that within the purview of this invention various changes may be made in the form, details, proportion and arrangement of parts, the combination therof and mode of operation, which generally stated consist in a device capable of carrying out the objects set forth.

The invention having thus been described, the following is claimed:

1. A connector unit for attaching a support member of a building to an internal wall member of the building comprising:

a first connector element, the first connector element having a body portion with a pair of spaced-apart flanges extending laterally therefrom at one side thereof, the body portion being attached to the support member, a second connector element, the second connector element having a body portion with a pair of axially spaced flanges extending laterally therefrom at opposite sides thereof, one of the flanges of the second connector element being attached to the wall member with the other flange of the second connector element positioned between the flanges of the first connector element and being spaced from the wall member, each of the two flanges of the first connector element having a hole therethrough, the holes being in alignment, the flange of the second connector element which is positioned between the flanges of the first connector element having a hole therethrough which is in alignment with the hole through each of the flanges of the first connector element, a pin extending through the holes of the connector elements and attached to the wall member, the pin having an enlarged head at one end thereof spaced from the flange of the first connector element which is remote from the wall member, the pin and the first connector element being relatively axially movable, the wall member and the support member thus being connected together so that they are relatively movable toward and away from each other but are not laterally relatively movable.

2. In support structure, a first member, a second member adjacent the first member, a first connector element, the first connector element having a body portion attached to the first member, the first connector element having a pair of spaced-apart flanges extending laterally therefrom at one side thereof, the flanges being substantially normal to the body portion, each of the flanges having an opening therethrough, the opening in one flange being in alignment with the opening in the other flange, a second connector element, the second connector element having a body portion and a pair of laterally extending flanges which are substantially normal to the body portion, one of the flanges of the second connector element being attached to the second member, the other flange of the second connector element being disposed intermediate the pair of flanges of the first connector element, the flange of the second connector element which is intermediate the flanges of the first connector element having an opening therethrough which is in alignment with the openings through the flanges of the first connector element, a pin extending through the openings of the flanges of the first connector element and through the openings in the flange of the second connector element, the pin being attached to the second member and having an enlarged head at the end thereof spaced from the flange of the first connector element which is remote from the second member, the pin being freely axially movable through the openings in the flanges of the first connector element, the first member and the second member thus being attached one to the other by the connector elements so that the first member and the second member are relatively movable toward and away from each other.

3. A connector device for connecting a support member to an adjacent wall member so as to permit relative reciprocable movement between the members in one direction only, said device comprising: pin means fixed to said wall member and extending therefrom in said one direction and having head means on the end thereof remote from said wall member, said pin means extending along one side of said support member in spaced relation thereto, a connector element fixed to said support member and having means closely surrounding said pin means but reciprocable on the pin means and spaced from both said wall member and spaced from both said wall member and said head means, said connector element having a body portion engaging and fixed to said support member and two parallel legs projecting from said body portion in a direction at right angles to the length of said pin means and spaced in the direction of the length of said pin means, said legs having holes therein receiving said pin means and being spaced from both said wall member and said head means, and a second connector element having a body portion fixed to said wall member and having at least one leg projecting from said body portion at right angles to the length of said pin means and disposed between the two legs of said first-mentioned connector element and spaced therefrom in the direction of the length of said pin means and having hole means therein through which said pin means extend, the body portion of said second connector element extending from said wall member in a direction parallel to the length of said pin means and the said one leg thereof being attached to the end of said body portion which is remote from said wall member while a second leg is provided on the end of the body portion of said second connector element which is adjacent said wall member and which second leg engages and is fixed to said wall member.

References Cited

UNITED STATES PATENTS

| | | | |
|---|---|---|---|
| 323,574 | 8/1885 | Goshorn | 16—134 |
| 606,177 | 6/1898 | McClelland | 16—132 X |
| 1,077,839 | 11/1913 | Kingston | 287—20.94 |
| 2,751,644 | 6/1956 | Pedersen | 287—20.94 |
| 3,225,394 | 12/1965 | Tillisch et al. | 287—20.92 |

FOREIGN PATENTS 819,146  10/1951  Germany.

RAMON S. BRITTS, Primary Examiner

U.S. Cl. X.R.

16—132; 52—573, 713; 248—216, 295; 287—20.92